US012343832B2

(12) United States Patent
Knutson et al.

(10) Patent No.: US 12,343,832 B2
(45) Date of Patent: Jul. 1, 2025

(54) SYSTEM AND METHOD TO ADJUST EXTENSION LENGTHS OF SLATS OF A WORK PLATFORM RELATIVE TO A WORKPIECE

(71) Applicant: THE BOEING COMPANY, Chicago, IL (US)

(72) Inventors: Samuel James Knutson, Charleston, SC (US); Brian Timothy Peters, Mount Pleasant, SC (US)

(73) Assignee: THE BOEING COMPANY, Arlington, VA (US)

( * ) Notice: Subject to any disclaimer, the term of this patent is extended or adjusted under 35 U.S.C. 154(b) by 848 days.

(21) Appl. No.: 17/395,924

(22) Filed: Aug. 6, 2021

(65) Prior Publication Data
US 2023/0038516 A1    Feb. 9, 2023

(51) Int. Cl.
 *B23Q 1/26*     (2006.01)
(52) U.S. Cl.
 CPC .................................. *B23Q 1/262* (2013.01)
(58) Field of Classification Search
 CPC ..................................................... B23Q 1/262
 See application file for complete search history.

(56) References Cited

U.S. PATENT DOCUMENTS

| 8,468,699 B2* | 6/2013 | Frauen ...................... B64F 5/10 29/897.2 |
| 2012/0056364 A1 | 3/2012 | DuBose et al. |
| 2020/0270107 A1 | 8/2020 | Hokanson et al. |

FOREIGN PATENT DOCUMENTS

| EP | 359129 A2 | 3/1990 |
| EP | 2407383 A2 | 1/2012 |
| EP | 3354413 B1 | 8/2019 |
| EP | 3594129 A1 | 1/2020 |
| EP | 4129831 A1 | 2/2023 |

OTHER PUBLICATIONS

Communication under Rule 71(3) EPC, for application No. 22188444.8 dated Aug. 9, 2024, pp. 1-5.
Extended European Search Report for Application No. 22188444.8 dated Jan. 2, 2023, pp. 1-5.

* cited by examiner

*Primary Examiner* — Nirvana Deonauth
(74) *Attorney, Agent, or Firm* — Moore IP Law

(57) ABSTRACT

A system to adjust extension lengths of slats of a work platform relative to a workpiece includes sensors to collect first data associated with a position of an outer surface of the workpiece at a height of the slats. The system includes actuators configured to extend or retract the slats. The system also includes a controller coupled to the sensors and to the actuators. The controller is configured to receive the first data and second data associated with rotation of the workpiece. The controller is configured to provide signals to the actuators of the work platform based on the first data and the second data. The signals cause the actuators to adjust or maintain extension lengths of the slats of the work platform to maintain separation distances between ends of the slats and the outer surface of the workpiece within a separation distance range as the workpiece rotates.

17 Claims, 5 Drawing Sheets

SYSTEM AND METHOD TO ADJUST EXTENSION LENGTHS OF SLATS OF A WORK PLATFORM RELATIVE TO A WORKPIECE

FIELD OF THE DISCLOSURE

The present disclosure is generally related to adjusting extension lengths of slats of a work platform relative to a workpiece.

BACKGROUND

Some large workpieces need to be rotated during manufacture to have access to particular areas of an outer surface of the workpiece. During the manufacture of some workpieces, a work platform for workers is used so that multiple workers are able to stand on the work platform and access an outer surface of the workpiece. After work on a first portion of the outer surface is completed, the workpiece is rotated to allow the workers to access a second portion of the outer surface from the work platform. For some manufacturing processes during rotation of the workpiece, workers move off of slats of the work platform that extend to the workpiece, an access barrier is utilized to inhibit access to the slats, the slats are retracted away from the workpiece, and the workpiece is rotated. After rotation of the workpiece, the slats are extended toward the workpiece so that ends of the slats are within a separation distance range of the workpiece, and the access barrier is released to allow workers to move onto the slats of the work platform. A time for the rotation process can be more than 20 minutes and there may be over 20 rotation processes for one complete revolution of the workpiece, which can result in a significant amount of non-value added work time associated with time needed for rotation and resetting the slats to allow workers access to the workpiece.

SUMMARY

In a particular implementation, a system to adjust extension lengths of slats of a work platform relative to a workpiece includes one or more sensors to collect first data associated with a position of an outer surface of the workpiece at a height of the slats. The system includes one or more actuators configured to extend or retract the slats. The system also includes a controller coupled to the one or more sensors and to the actuators. The controller is configured to receive the first data and second data associated with rotation of the workpiece. The controller is configured to provide signals to the one or more actuators of the work platform based on the first data and the second data. The signals cause the one or more actuators to adjust extension lengths of the slats of the work platform to maintain separation distances between ends of the slats and the outer surface of the workpiece within a separation distance range as the workpiece rotates.

In another particular implementation, a system to adjust extension lengths of slats of a work platform relative to a workpiece includes an endpiece configured to couple to the workpiece. The endpiece includes a gear portion. The system includes a rotation drive coupled to the gear portion. The rotation drive is configured to rotate the workpiece relative to a longitudinal axis of the workpiece by rotation of the endpiece via the gear portion. The system includes a sensor to generate first data associated with a position of the endpiece. The system includes the work platform. The work platform comprises the slats and actuators. Each slat is coupled to an actuator of the actuators. A particular actuator for a particular slat is configured to slide an end of the particular slat toward or away from the outer surface of the workpiece. The system also includes a controller coupled to the sensor. The sensor is configured to receive the first data. The sensor is configured to provide signals to the actuators based on the first data and based on second data associated with rotation of the workpiece. The signals cause the actuators to adjust positions of ends of the slats relative to the outer surface so that separation distances between the outer surface and the ends of the slats are within a separation range after a change of the position of the workpiece due to rotation of the endpiece In another particular implementation, a method of adjusting extension lengths of slats of a work platform relative to a workpiece to accommodate rotation of the workpiece includes obtaining operation data at a controller. The operation data includes first data associated with a position of an outer surface of the workpiece at a height associated with the slat ends of the work platform and second data associated with rotation of the workpiece. The method also includes sending signals from the controller to one or more actuators of the work platform. The signals are based on the operation data. The signals cause the actuators to adjust extension lengths of the slats of the work platform relative to the workpiece.

The features, functions, and advantages described herein can be achieved independently in various implementations or may be combined in yet other implementations, further details of which can be found with reference to the following description and drawings. The drawings are conceptual and not drawn to scale.

DETAILED DESCRIPTION

Figure 1:
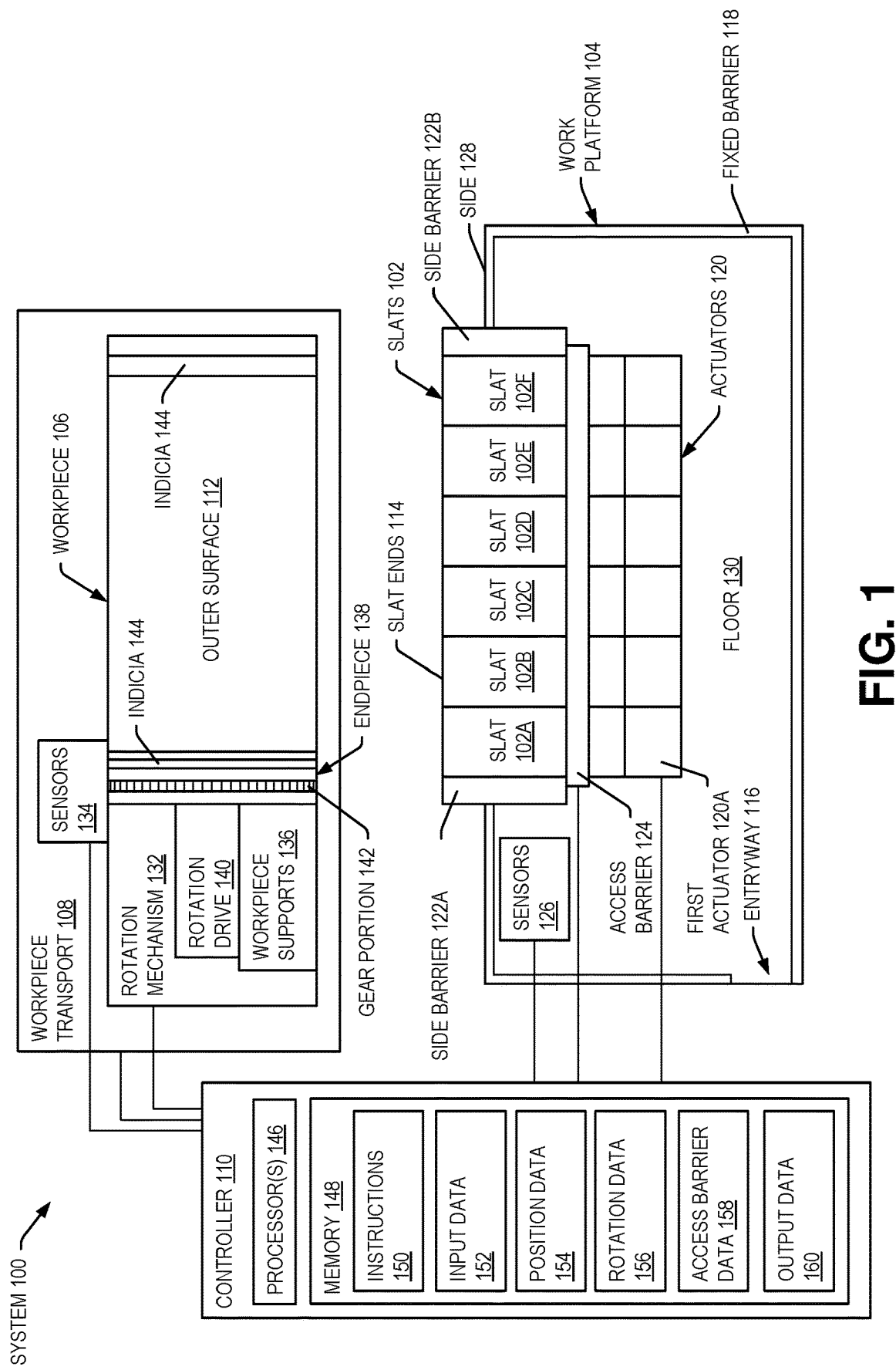
FIG. 1 is a block diagram of a system to adjust extension lengths of slats of a work platform relative to a workpiece.

A workpiece on a workpiece transport is positioned in working relation to a work platform. The work platform is at an elevated height that enables workers standing on the work platform to access a portion of an outer surface of the workpiece. Workers stand on slats of the work platform. The slats are extended toward the workpiece so that a separation distance between ends of the slats and the workpiece is in a separation distance range that is not too close to the workpiece or too far away from the workpiece (e.g., based on safety and industrial hygiene tolerances). The workpiece is rotated to change the portion of the outer surface of the workpiece accessible to the workers. During rotation of the workpiece, a position of the outer surface of the workpiece changes relative to the work platform due to a shape of the workpiece, a rotational axis of the workpiece, or both. A controller receives operation data from sensors. The operation data includes first data corresponding to a position, and upcoming positions, of the outer surface of the workpiece at the height of the slats, and second data corresponding to rotation information associated with rotation of the workpiece (e.g., a rotation direction and a rotation rate). Based on the operation data, the controller provides signals to actuators of the work platform that cause one or more of the actuators to adjust extension lengths of the slats so that separation distances from the ends of the slats to the outer surface of the workpiece are in the separation distance range, cause one or more of the actuators to leave an extension length unchanged, or both. Adjusting the extension lengths of one or more of the slats, leaving the extension length of one or more slats unchanged, or both, during rotation of the workpiece enables workers to remain on the slats during rotation of the workpiece and avoids accumulation of a large amount of non-value added time for manufacture of the workpiece associated with waiting for rotation and repositioning of the slats when the workpiece is rotated.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features referred to herein as a group or a type are referenced (e.g., when no particular one of the features is being referenced), the reference number is used without a distinguishing letter. However, when one particular feature of multiple features of the same type is referred to herein, the reference number is used with the distinguishing letter. For example, referring to FIG. 1, slats 102A-102F are shown. When referring to a particular one of these slats, such as the slat 102E, the distinguishing letter "E" is used. However, when referring to any arbitrary one of these slats or to these slats as a group, the reference number 102 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority, order, or arrangement of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram of a system 100 to adjust extension lengths of slats 102 of a work platform 104 relative to a workpiece 106. The system 100 includes the work platform 104, a workpiece transport 108 that supports the workpiece 106, and a controller 110. In particular implementations, components of the controller 110 are coupled to the work platform 104, the workpiece transport 108, or both.

The work platform 104 is a support for workers to stand on to access an outer surface 112 of the workpiece 106 at an elevated height so that the workers are able to ergonomically access a portion of the outer surface 112 of the workpiece 106. For example, workers have the ability to access the workpiece 106 while standing without working at a height significantly above their shoulders or significantly below their waists for extended periods of time. In some implementations, the workers perform activities on the portion as the workpiece 106 is continuously rotated at a slow rate or is rotated by a particular amount after a passage of a time period. In other implementations, the workers perform the activities on the portion and, after completion of the activities, an input is provided to the controller 110 that causes the controller 110 to rotate the workpiece 106 by a particular amount to allow access to a next portion of the workpiece 106 to be worked on.

The work platform 104 includes at least one entryway 116, fixed barriers 118 that define limits of the work platform 104, the slats 102, actuators 120 to extend or retract the slats 102, side barriers 122, an access barrier 124 to the slats 102, and sensors 126. The entryway 116 can be accessed by workers via stairs, a ladder, or a personnel lift system. The fixed barriers 118 are railings, one or more walls of a building, or both. FIG. 1 depicts six slats 102 and six actuators 120. In other implementations, the system 100 includes fewer or more slats 102 and actuators 120 than the number of slats 102 and actuators depicted in FIG. 1.

The work platform 104 is at an elevated height relative to a floor that supports the workpiece transport 108. The controller 110 is provided with data that indicates a height of slat ends 114 of the slats 102 to facilitate determination of appropriate extension lengths of the slats 102. In some implementations, the height of the work platform 104 above a floor that supports the workpiece transport 108 is greater than 2 meters, greater than 5 meters, or greater than 10 meters. In some implementations, the height of the work platform 104 above the floor is adjustable (e.g., by a hydraulic or mechanical lift system) to accommodate workpieces 106 of different sizes. When the height of the work platform 104 is adjustable, one or more sensors of the sensors 126 provide the controller 110 with data indicating the height of the work platform 104 at the slat ends 114 of the slats 102.

The actuators 120 include housings that are fixed to the work platform 104 and include arms that are coupled to the slats 102. One or more arms of one or more actuators 120 are coupled to each slat 102. The arms of the actuators 120 are configured to extend the ends 114 of the slats 102 to particular distances in a range from a retracted position to a fully extended position. The slat ends 114 in the fully extended position can be a length of 2 meters beyond the retracted position or some other chosen length. The arms of the actuators 120 can be hydraulically driven, pneumatically driven, or mechanically driven.

The actuators 120 are electrically coupled to the controller 110 either by a wired connection or a wireless connection. Signals provided from the controller 110 to the actuators 120 are used by the actuators 120 to set lengths of the arms by extending or retracting portions of the arms relative to the housings, which sets extension lengths of the slats 102 relative to a side 128 of the work platform 104. The housings of the actuators 120 and portions of the slats 102 are coupled to supports on an underside of the work platform 104. In some implementations, portions of one or more of the supports include rollers to facilitate extension and retraction of the slats 102 by the arms of the actuators 120.

In some implementations, the slat ends 114 include indicia (e.g., black and yellow striping) to visibly indicate the location of the slat ends 114. In some implementations, the slat ends 114 include soft and deformable endpieces (e.g., foam endpieces) that inhibit damage to the workpiece 106 should one or more of the slat ends 114 contact the workpiece 106.

The side barrier 122A includes a first portion that extends and retracts in accordance with extension and retraction of a first slat 102A to provide a barrier at a first side of the slats 102. In an implementation, the first portion of the side barrier 122A is coupled to the first slat 102A and moves with the first slat 102A as the first slat 102A is extended or retracted by the arm(s) of the actuator(s) 120 coupled to the first slat 102A. A part of the first portion is configured to slide into a second portion of the side barrier 122A that is coupled to a floor 130 of the work platform 104. The second portion of the side barrier 122A does not move toward and away from the workpiece 106. Similarly, the side barrier 122B includes a first portion that extends and retracts in accordance with extension and retraction of a second slat 102F to provide a barrier at a second side of the slats 102. In an implementation, the first portion of the side barrier 122B is affixed to the second slat 102F and moves with the second slat 102F as the second slat 102F is retracted or extended by the arm(s) of the actuator(s) 120 coupled to the second slat 102F. A part of the first portion of the side barrier 122B is configured to slide into a second portion of the side barrier 122B that is coupled to the floor 130 of the work platform 104. The second portion of the side barrier 122B does not move toward and away from the workpiece 106.

In addition, temporary barriers can be placed on the slats 102 if needed. For example, if a protrusion from the outer surface 112 of the workpiece 106 causes retraction of two slats 102D, 102E next to extended slats 102C, 102F such that a large gap is present between one or both of the extended slats 102C, 102F and the protrusion from the outer surface 112, one or more temporary barriers can be coupled to one or both of the extended slats 102C, 102F to form a barrier on the sides and in front of the large gap. The one or more temporary barriers can be removed after the retracted slats 102D, 102E are extended such that the large gap is eliminated.

The access barrier 124 is used to allow or inhibit worker access to the slats 102. The access barrier 124 is coupled to the floor 130 of the work platform 104 near to, or at, an interface with the slats 102. When a workpiece 106 is positioned in working relation to the work platform 104 and the slats 102 are extended to within a separation distance range of the workpiece 106, the controller 110 places the access barrier 124 in an open status that causes opening of one or more gates in the access barrier 124 or removal (e.g., retraction) of all or a portion of the access barrier 124. When the access barrier 124 is in the open status, workers can move onto or off of the slats 102 and the workpiece 106 is a barrier in front of the slat ends 114. When a workpiece 106 is not positioned in working relation to the work platform 104 or the slats 102 are not extended to within the separation range of the workpiece 106, the controller 110 places the access barrier 124 in a closed status that causes the access barrier 124 to inhibit worker access to the slats 102.

In an implementation, usage data is provided from one or more usage sensors of the sensors 126 (e.g., cameras, load sensors, etc.) to the controller 110. Based on the usage data, the controller 110 prevents a change in access barrier status from the open status to the closed status when the usage data indicates one or more workers are on the slats 102. The controller 110 prevents a change of the access barrier status from the closed status to the open status when there is no workpiece 106 positioned in front of the work platform 104 with the slats 102 of the work platform 104 extended to within the separation distance of the workpiece 106. The controller 110 can also be configured to inhibit movement of the workpiece transport 108 towards or away from the work platform 104 when the access barrier 124 has the open status.

The sensors 126 are coupled to the controller 110 and provide data to the controller 110. The sensors 126 can be coupled to the controller 110 by wireless or wired connections. The platform sensors 126 can include distance sensors in one or more of the slats that provide distance data to an object (e.g., the workpiece 106) in front of the slats 102, one or more sensors that detect whether the slat ends 114 are positioned in front of a groove in the workpiece, one or more distance sensors that provide distance data to indicia of the workpiece 106 that indicates information associated with the outer surface 112 of the workpiece 106, the one or more usage sensors, one or more sensors that provide data associated with a height of the work platform 104 when the height of the work platform 104 is adjustable, other sensors, or combinations thereof.

The distance data from the distance sensors in one or more of the slats 102 can be used by the controller 110 to determine whether a workpiece 106 is positioned in working relation to the work platform 104. In some implementations, the distance data from the distance sensors in one or more of the slats 102 and other sensor data is used by the controller 110 to inhibit extension of the slat ends 114 into openings or grooves in the workpiece 106 and can be used by the controller 110 to set initial extension lengths of the slats 102 when the slats 102 are initially extended from retracted positions toward the workpiece 106.

The workpiece 106 is a large object (e.g., a mandrel for forming a portion of a fuselage of a passenger aircraft) that is rotated about a longitudinal axis to enable workers to access the outer surface 112 of the workpiece 106 at an elevated height relative to the floor that supports the workpiece transport 108. In some implementations, the workpiece 106 has a substantially circular, elliptical, or other cross-sectional shape. The outer surface 112 can have surface irregularities (e.g., indentations, openings, protrusions, flat sections, etc.). When the workpiece 106 is rotated, a location of the outer surface 112 at a height of the slats 102 of the work platform 104 changes so that extension lengths the slats 102 relative to the side 128 of the work platform 104 need to be adjusted by the controller 110 to prevent damage to one or more of the slats 102, the workpiece 106, or both, due to contact of the workpiece 106 and the one or more slats 102 during rotation of the workpiece 106. Adjustment of the extension lengths of the slats 102 by the controller 110 is also performed to prevent too large a gap from forming between ends of the slats 102 and the workpiece 106. A workpiece 106 that has surface irregularities, a workpiece 106 with a non-circular cross-sectional shape, a workpiece 106 with a substantially circular cross-sectional shape that is not rotated about the central axis of the workpiece 106, or combinations thereof, can make basing the extension lengths of the slats 102 based on sensor data that directly measures one or more distances to the outer surface 112 of the workpiece 106 impractical.

The gap between the slat ends 114 and an effective location of the workpiece surface (e.g., locations of the outer surface 112 or where the outer surface would be without consideration of recesses or openings in the outer surface 112) is maintained by the controller 110 in a separation distance range as the workpiece 106 rotates. The separation distance range can be a range that is close to the effective location of the workpiece surface (e.g., greater than 0.1 cm away from the effective location of the workpiece 106) up to a second distance (e.g., up to 25 cm or more) but large enough to accommodate layers of a composite layup or other material added onto the outer surface. For example, the separation distance range from the effective location of the workpiece surface can be from 1 cm to 25 cm, 2 cm to 15 cm, or some other selected range. In some implementations, the second distance is less than a width associated with an average person's shoe in order to inhibit a likelihood of any portion of a leg of a worker from being positioned below an upper surface of the slats 102 and in order to inhibit items (e.g., tools) from falling through the gap between the slats 102 and the workpiece 106.

In some implementations, the workpiece 106 includes a broadening taper from a first particular length of the workpiece 106, a narrowing taper for a second particular length of the workpiece 106, a curved portion extending for a third particular length of the workpiece 106, or combinations thereof. One or more of the slat ends 114 can be shaped (e.g., slanted or curved) to correspond to lengths of the workpiece 106 that taper or curve.

In a particular implementation, the workpiece 106 is a fuselage, or a portion of a fuselage, of an aircraft that has a substantially elliptical cross-sectional shape with one or more outer surface irregularities to accommodate stringers (e.g., longitudinal grooves), landing gear, windows, wings, etc. During a manufacturing process, workers access the outer surface 112 to perform operations on the fuselage. For example, workers place stringers, which are long strengthening members that include uncured polymer material, in corresponding longitudinal grooves in the fuselage, and cover the fuselage with a plastic covering that is sealed to the fuselage. After the stringers are placed in corresponding indentations on the fuselage around the fuselage, the fuselage and stringers are subjected to a curing process to integrate the stringers with the fuselage. Subsequently, the plastic covering is removed and additional manufacturing processing is performed on the fuselage.

The workpiece transport 108 supports the workpiece 106 and allows the workpiece 106 to be moved to a position in working relation to the work platform 104. The workpiece transport 108 includes a rotation mechanism 132 and sensors 134. In some implementations, the workpiece transport 108 includes a drive to move the workpiece transport 108 relative to the work platform 104 to a desired position. In other implementations, a separate vehicle or drive system is used to move the workpiece transport 108 to the desired position relative to the work platform 104. In some implementations, when the workpiece transport 108 is located in the desired position, the workpiece transport 108 is locked in position to prevent unintentional movement of the workpiece transport 108.

The rotation mechanism 132 of the workpiece transport 108 enables rotation of the workpiece 106 about a longitudinal axis of the workpiece 106. In some implementations, the longitudinal axis is a central longitudinal axis of the workpiece 106. In other implementations, the longitudinal axis is offset from the central longitudinal axis of the workpiece 106. The rotation mechanism 132 includes workpiece supports 136, endpieces 138 coupled to the workpiece 106, and a rotation drive 140. The endpieces 138 are rotationally coupled to the workpiece supports 136 of the workpiece transport 108. In some implementations, additional workpiece supports 136 (e.g., rollers) of the workpiece transport 108 are used to support the workpiece 106 at one or more locations along a length of the workpiece 106.

One or both of the endpieces 138 include a first portion that corresponds to and is securely coupled to the workpiece 106 such that rotation of the endpieces 138 by the rotation mechanism 132 rotates the workpiece 106, a second portion with a circular cross-sectional shape that includes gear portions 142 (e.g., gear teeth to fit in corresponding gear teeth of a drive gear or links of a drive chain, or recesses configured to receive gear teeth of a drive gear) that are engaged by corresponding gear portions coupled to the rotation drive 140, and a third portion that is a transition between the first portion and the second portion. In some implementations, one or both endpieces 138 are permanently coupled to the workpiece 106 (e.g., welded to one or more support members of the workpiece 106); while in other implementations, one or both of the endpieces 138 are removably coupled to the workpiece 106 (e.g., bolted to one or more support members of the workpiece 106) to enable reuse of one or both of the endpieces 138. Attaching the endpieces 138 to the workpiece 106 enables the controller 110 to determine extension distances of the slats 102 of the work platform 104 based on an angular position of one or both endpieces 138 that are coupled to the workpiece supports 136 of the workpiece transport 108.

Indicia 144 are formed in one or more surfaces of one or both of the endpieces 138, printed on one or more surfaces of one or both of the endpieces 138, coupled to one or more surfaces of one or both of the endpieces 138, or combinations thereof. In an alternate implementation, the indicia 144 are formed or printed on a portion of the workpiece 106 without significant surface irregularities. The indicia 144 are read by one or more position sensors of the sensors 134, the sensors 126, or both, and data from the one or more position sensors is used by the controller 110 to determine extension lengths of the slats 102 of the work platform 104. In some implementations, the indicia 144 are on a circumferential portion of the second portion of one or both of the endpieces 138, on a circumferential portion of the workpiece 106, or combinations thereof. In some implementations, the indicia 144 are on a front face or back face of the second portion.

In an implementation, the indicia 144 include separate indicia 144 for each slat 102 of the slats 102 on a circumferential portion of the second portion of one or both endpieces 138 or on a circumferential portion of the workpiece 106. The indicia 144 are read by a plurality of contour sensors of the contour sensors of the sensors 126, the sensors 134, or both, for each separate indicia. For some implementations, a particular separate indicia 144 of the separate indicia can be associated with more than one slat 102.

The plurality of contour sensors associated with the particular separate indicia include a first contour sensor that provides data associated with a current position of slat end 114 of a corresponding slat, a second contour sensor that provides data associated with where the slat end 114 of the corresponding slat will be due to rotation of the workpiece 106 in a first direction, and a third contour sensor that provides data associated with where the slat end 114 will be due to rotation of the workpiece 106 in a second direction opposite to the first direction. The contour sensors can include or correspond to, for example, optical sensors or contact sensors. The optical sensors optically determine the contours of the indicia 144 based on return optical signals corresponding to optical signals sent to the indicia. The contact sensors include sensor heads that contact the indicia 144, The sensor heads are coupled to arms and the contact sensors provide data to the controller 110 corresponding to an amount of extension or retraction of the arms as the workpiece 106 rotates. When the workpiece 106 is rotated, the controller 110 receives second data from the rotation mechanism 132 that indicates a rotation direction (i.e., the first direction or the second direction), a rotation rate of the workpiece, or both. Based on the rotation direction, the controller 110 acquires data from an appropriate contour sensor (e.g., the second contour sensor or the third contour sensor) and from the first contour sensor.

In a particular aspect, each separate indicia 144 around a circumference of the second portion includes raised portions, recesses, or both, that indicate an approximate contour of the outer surface 112 of the workpiece 106 at a height of a corresponding slat(s) 102. The approximation of the contour ignores some surface irregularities in the outer surface 112 of the workpiece 106 (e.g., openings or grooves in the outer surface 112 of the workpiece 106). For a first indicia 144 that corresponds to the first slat 102A controlled by a first actuator 120A, when the workpiece 106 is rotating in the first direction at a particular rotation rate, data from the first contour sensor and the second contour sensor are used to generate a contour map of the indicia 144 that corresponds to changes in the location of the outer surface 112 of the workpiece 106 due to the rotation of the workpiece 106 in the first direction at the rotation rate. The controller 110 uses the information of where the outer surface will be to generate signals for the actuator 120A that cause the actuator to adjust the extension length of the slat 102A, or leave the extension length of the slat 102A unchanged, to maintain the separation distance between the slat end 114 and the workpiece 106 in the separation distance range.

For example, the first contour sensor associated with the first slat 102A provides first data to the controller 110 that indicates the first distance from the first contour sensor to the first indicia 144 is 6 cm. The contour map determined with data from the second contour sensor and the rotation rate enables the controller 110 to determine that in a particular amount of time (e.g., 0.2 seconds) the first distance from the first contour sensor to the first indicia will be 6.07 cm. Based on the negative difference (i.e., −0.07 cm), the controller 110 generates a signal for the first actuator 120A that causes the first actuator 120A to extend the first slat 102A by a particular distance directly proportional to the negative difference during rotation of the workpiece 106 so that at the particular time, the slat end 114 of the first slat 102A is within the separation distance range from the workpiece 106. In an alternate implementation, the negative difference causes the controller 110 to generate a signal for the first actuator 120A that causes the first actuator 120A to retract the first slat 102A by a particular distance directly proportional to the negative difference during rotation of the workpiece 106 so that at the particular time, the slat end 114 of the first slat 102A is within the separation distance range from the workpiece 106.

In another implementation, a position sensor of the sensors 126, sensors 134, or both, provides data that corresponds to the indicia 144 on one of the endpieces 138 to the controller 110. Based on the data, the controller 110 determines an identifier associated with particular indicia read by the position sensor and accesses a table based on the identifier to find information that enables determination of signals to send to the actuators 120 to set the extension lengths of the slats 102 relative to the side 128 of the work platform 104 at the height of the slats 102. In another implementation, the controller 110 receives angular position data from one or more sensors of the sensors 134 corresponding to an angular position of the workpiece 106 relative to a reference position (e.g., an angle from a center of rotation designated as zero degrees or zero radians). Based on the angular position data, the controller 110 determines an identifier associated with a particular angular position corresponding to the data and accesses the table based on the identifier to find information that enables determination of signals to send to the actuators 120 to set the extension lengths of the slats 102 relative to the side 128 of the work platform 104 at the height of the slats 102.

Each identifier corresponds to a row in the table, and columns in the table include information associated with the slats 102. A first column associated with a particular slat indicates a horizontal distance of the outer surface of the workpiece 106 from a reference position of the workpiece transport 108. A second column associated with the particular slat indicates a rate of change for the position of the slat to maintain the slat within the separation range during rotation of the workpiece 106 in the first direction at a reference rotation rate from the current position to a position associated with the next row of the table, or the first row if the present row is the last row of the table. A third column associated with the particular slat indicates a rate of change for the position of the slat to maintain the slat within the separation range during rotation of the workpiece 106 in the second direction at the reference rotation rate from the current position to a position associated with the previous row of the table, or the last row if the present row is the first row of the table.

For these implementations, the workpiece 106 is initially rotated by the rotation mechanism 132 until the position sensor is aligned with one of the indicia 144 corresponding to a particular identifier in the table or until the angular position data provided by the angular position sensor indicates that a current angular position corresponds to a particular identifier in the table. The controller 110 determines initial signals to adjust the slats 102 from retracted positions to extended positions in the separation distance range based on the data from the sensor and sends the initial signals to the actuators 120 to cause the actuators 120 to extend the slats 102 toward the workpiece 106. The controller 110 determines the initial signals based on information in the table from the row corresponding to the particular identifier and the first columns corresponding to the individual slats 102, based on position data associated with the workpiece transport 108, and position data associated with the work platform 104.

After the positions of the slats 102 are set based on the initial signals, the controller 110 receives a command to rotate the workpiece 106 continuously or in increments. For example, the controller 110 receives a command to rotate the workpiece 106 in the second direction at a first rate. In response to the command, the controller 110 generates first signals that are sent to the actuators 120 to cause the actuators 120 to set an extension rate, or a retraction rate, of corresponding slats 102 by the corresponding actuators 120 for a period time during rotation of the workpiece 106. The first signals are based on the information in the table from the third columns associated with the slats 102 for the row corresponding to the particular identifier adjusted for any difference between the first rate and the reference rate. When the position sensor provides data to the controller 110 indicating detection of the next identifier, or when the controller 110 determines that the angular position corresponds to the next identifier, the controller 110 determines the first signals based on the information in the table corresponding to the next identifier and provides the first signals to the actuators 120 to cause the actuators 120 to set the extension rate, or the retraction rate, of corresponding slats 102 to values indicated by the first signal. The extension rate or retraction rate included in a particular signal for a particular slat 102 can be zero, which causes the actuator 120 associated with the slat 102 to maintain a current extension length of the particular slat 102.

The controller 110 includes one or more processors 146 and a memory 148. The memory 148 is a non-transitory memory. The memory 148 includes instructions 150 that are executable by the processor(s) 146 to perform operations to send signals to the actuators 120 that cause the actuators 120 to adjust extension length of one or more of the slats 102, maintain the extension length of one or more slats 102, or both, to maintain the separation distance between the slat ends 114 and the workpiece 106 in the separation range during rotation of the workpiece 106. The memory 148 includes input data 152, position data 154, rotation data 156, access barrier data 158, output data 160, other data, or combinations thereof.

The input data 152 includes data from one or more input devices, data from the sensors 126, data from the sensors 134, other data, or combinations thereof. The processor(s) 146 generates the position data 154, the rotation data 156, the access barrier data 158, and the output data 160 based on the input data 152.

The position data 154 indicates positions of the workpiece transport 108 and the work platform 104. The positions include locations of the workpiece transport 108 when the workpiece transport 108 is in a working relation to the work platform 104, a location of the work platform 104, a height of the slats 102, other position information, or combinations thereof. The rotation data 156 includes information regarding rotation of the workpiece 106 by the rotation mechanism 132. The rotation information includes a rotation direction, a rotation rate, rotation drive status (e.g., is the rotation drive on or off), an interval between rotations when the rotation mechanism 132 operates at periodic intervals, other information, or combinations thereof. The access barrier data 158 includes status of the access barrier 124, rules associated with a change in the status of the access barrier 124, other information, or combinations thereof.

The output data 160 includes output generated based on the position data 154, the rotation data 156, the access barrier data 158, other data, or combinations thereof. The output data 160 includes information provided to one or more display devices and signals provided to one or more devices (e.g., the actuators 120). The signals include control signals that cause or stop operation of the rotation mechanism 132; signals that enable or inhibit movement of the workpiece transport 108 toward or away from the work platform 104; access barrier signals associated with operation of the access barrier 124; and signals provided to the actuators 120 that cause adjustment of extension lengths of one or more of the slats 102, cause an extension length of one or more slats to be maintained, or both.

The system 100 of FIG. 1 enables reduction of non-value added time of a workpiece 106. For example, the system 100 eliminates or reduces idle time during rotation of a workpiece to a new position by ensuring worker safety without requiring workers to leave the work area around the slats 102. For example, without the system 100, during rotation of the workpiece 106, workers may need to move off of slats 102 to retract the slats 102, rotate of the workpiece 106, and re-extend the slats 102 to a safe position, all of which is non-value added time. Use of the system 100 reduces the non-value time by enabling the workers to safely remain on the slats 102 and continue to perform value added work (e.g., placement of stringers on a fuselage of an aircraft) as the workpiece 106 is rotated.

Figure 2:
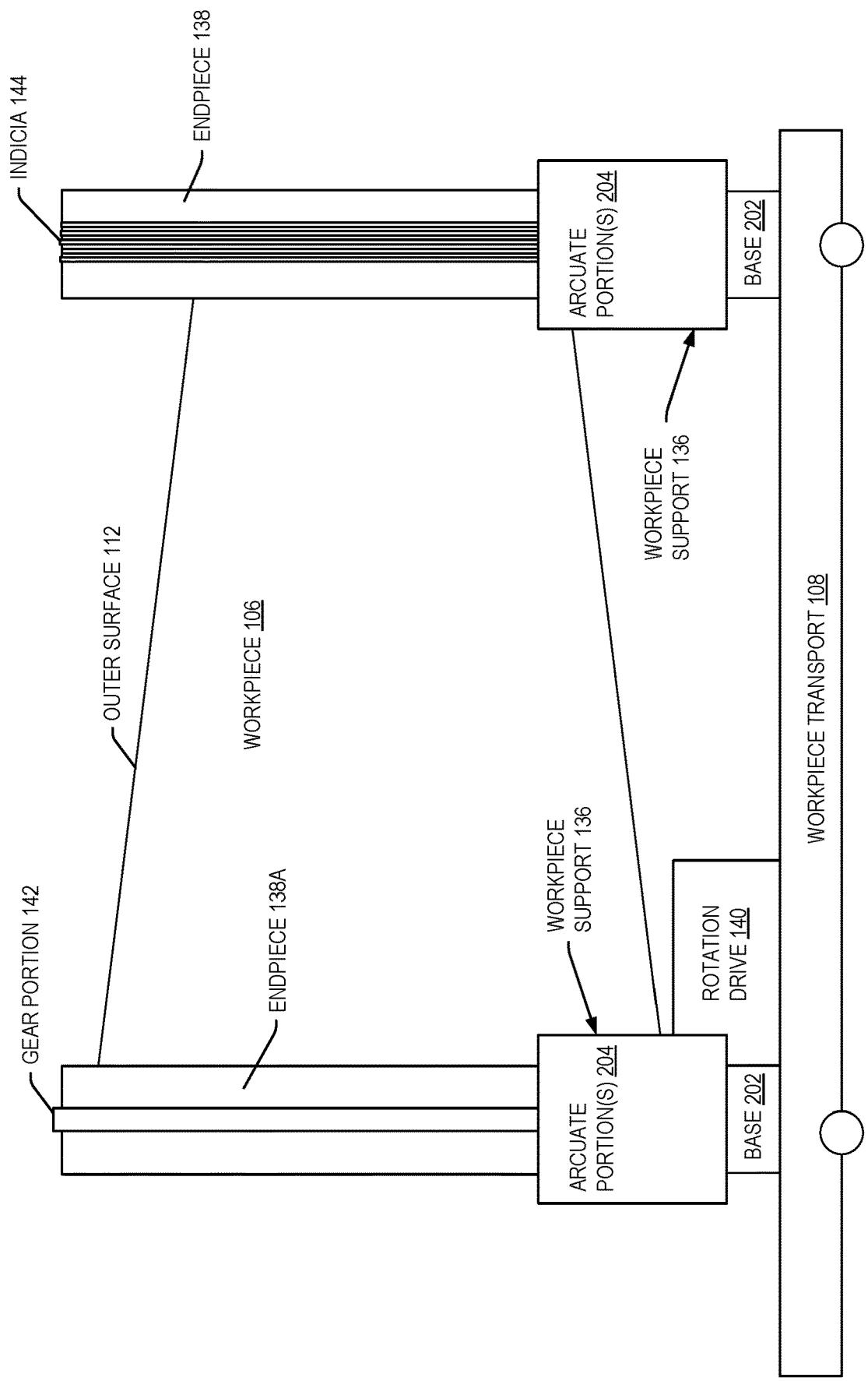
FIG. 2 is a side view representation of a workpiece transport that supports a workpiece.

FIG. 2 depicts a side view representation of a workpiece 106 coupled to a workpiece transport 108 that supports the workpiece 106. The workpiece supports 136 include bases 202 and one or more arcuate portions 204. The one or more arcuate portions 204 have surfaces configured to complement outer surfaces of the cylindrical portions of the endpieces 138 of the workpiece 106 including gear portions 142 and contour changes of indicia 144 and configured to accommodate coupling of a gear portion coupled to the rotation drive 140 for the endpiece 138A that is rotated by the rotation drive 140.

Figure 3:
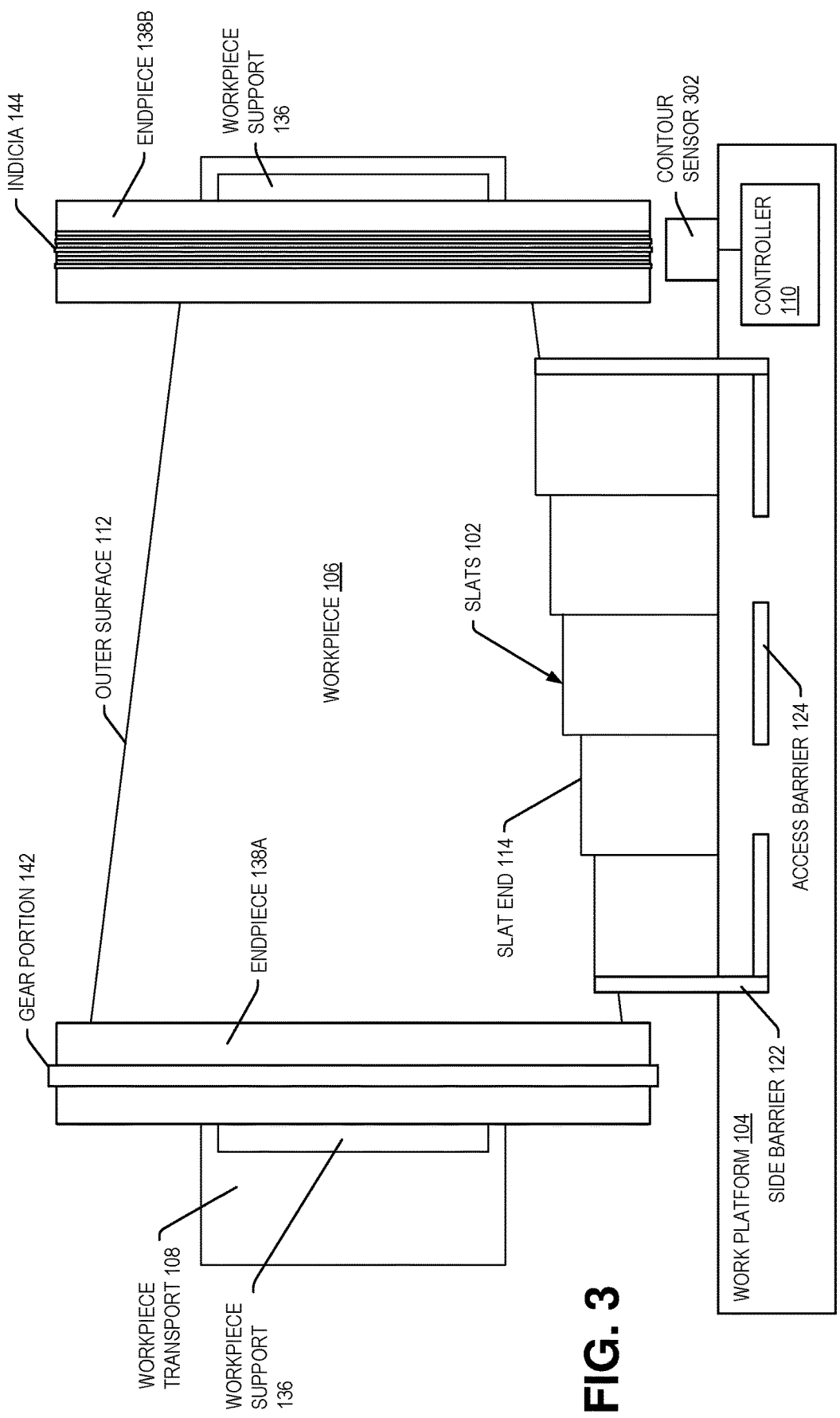
FIG. 3 is an elevation view representation of workpiece positioned relative to a workpiece with slats of a work platform extended toward the workpiece.

FIG. 3 depicts a top view representation of a workpiece 106 on a workpiece transport 108 positioned in working relation to a work platform 104. The endpieces 138 that are coupled to the workpiece 106 are positioned on workpiece supports 136. The gear portion 142 of the endpiece 138A enables rotation of the endpieces 138 and the workpiece 106 by the workpiece transport 108.

A contour sensor 302 coupled to the work platform 104 is positioned to read contours of indicia 144 of the endpiece 138B. The contour sensor 302 sends data associated with the contours of the indicia 144 to the controller 110. The data is used by the controller 110 to adjust or maintain extension lengths of the slats 102 as the workpiece 106 rotates to maintain a separation distance between slat ends 114 of the slats 102 and the outside surface 112 of the workpiece in a separation distance range. In the depiction of FIG. 3, the slats 102 are extended toward the workpiece 106 and are positioned within the separation distance range of the outside surface 112 of the workpiece 106. Side barriers 122 are positioned on each side of the slats 102 and an access barrier 124 is open to allow worker access to the slats 102.

Figure 4:
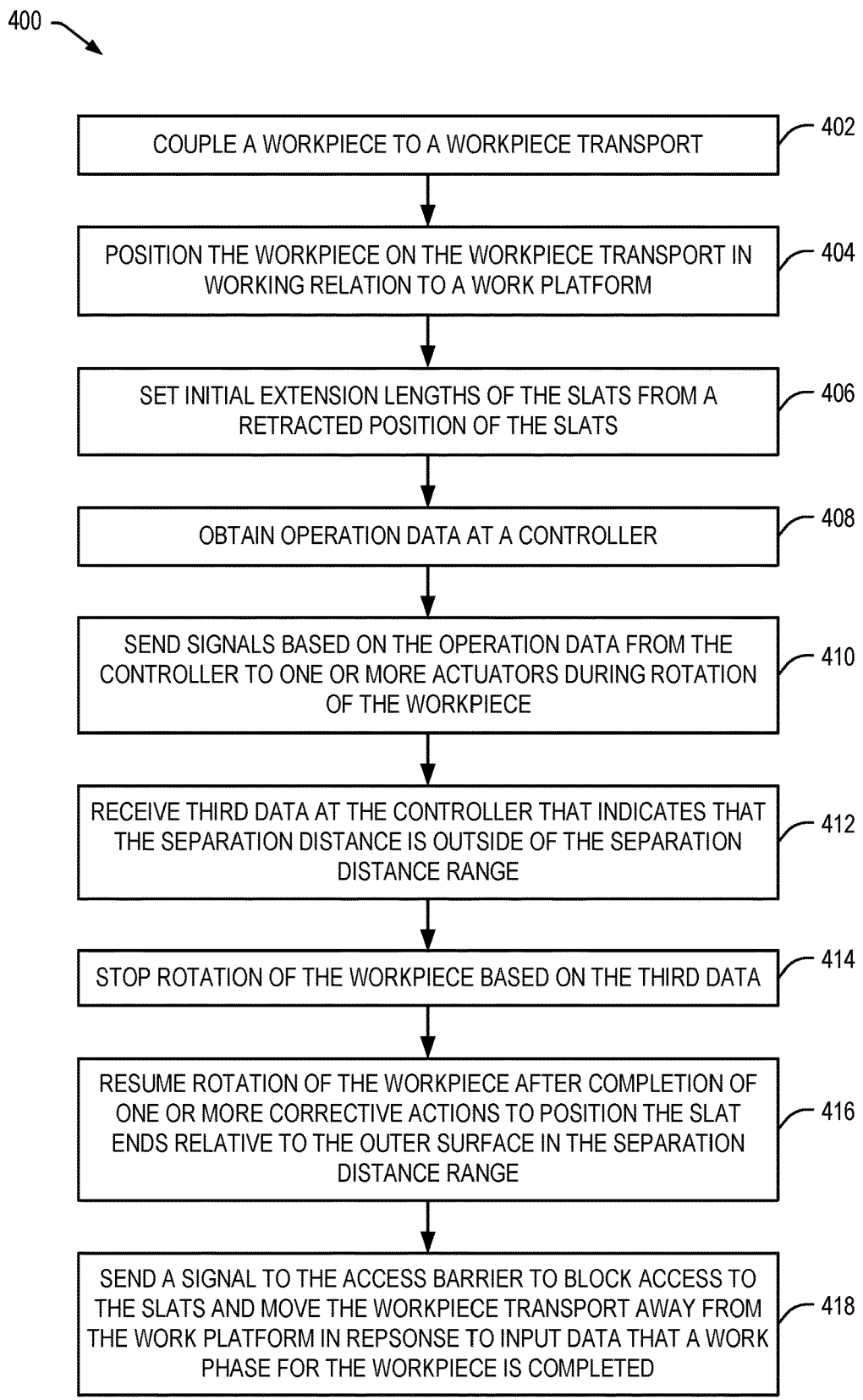
FIG. 4 is a flowchart of a method of adjusting extension lengths of slats of a work platform to maintain a separation distance between ends of the slats and an outer surface of a workpiece in a separation distance range during rotation of the workpiece.

FIG. 4 is a flow chart of a method 400 of adjusting extension lengths of slats 102 of a work platform 104 to maintain a separation distance between ends 114 of the slats 102 and an outer surface 112 of the workpiece 106 in a separation distance range during rotation of the workpiece 106. The method 400, at block 402, includes coupling the workpiece 106 to a workpiece transport 108. During coupling of the workpiece 106 to the workpiece transport 108, the workpiece 106 with a first endpiece 138 coupled to a first end of the workpiece 106 is positioned on the workpiece transport 108 such that the first endpiece 138 is positioned in a workpiece support 136 so that a gear portion 142 on the first endpiece 138 is coupled to a rotation drive 140 of the workpiece transport 108. When the first endpiece 138A is positioned in the workpiece support 136, a second endpiece 138B coupled to a second end of the workpiece 106 is positioned in a second workpiece support 136. In some implementations a crane is used during the positioning of the workpiece 106 with the endpieces 138 on the workpiece transport 108.

The method 400, at block 404, includes positioning the workpiece 106 on the workpiece transport 108 in working relation to the work platform 104. When the workpiece 106 is positioned in working relation to the work platform 104, the position of the workpiece transport 108 can be locked to prevent unintentional movement of the workpiece transport 108. Sensors 126, 134 provide position data to a controller 110 to enable the controller 110 to determine the position of an outer surface 112 of the workpiece 106 at the height of slat ends 114 of the slats 102.

The method 400, at block 406, includes setting initial extension lengths of the slats 102 from a retracted position of the slats 102. Setting the initial extension lengths of the slats 102 includes providing slat end position data to the controller 110 from the sensors 126, 134. Based on the slat end position data, the controller 110 generates signals sent to actuators 120. The signals cause the actuators 120 to extend the slats 102 toward the workpiece 106 to positions in the separation distance range. In some implementations, the workpiece 106 is rotated to a particular position, and the signals are generated based on the particular position. When the slats 102 are positioned in the separation distance range, the controller 110 provides a signal to an access barrier 124 that causes the access barrier 124 to open a gate(s) in the access barrier 124 or retract all or a portion of the access barrier 124 to enable workers to walk onto the slats 102.

The method 400, at block 408, includes obtaining operation data at the controller. The operation data includes first data associated with a position of an outer surface 112 of the workpiece 106 at a height of the slat ends 114 and second data associated with rotation of the workpiece 106. The operation data is provided to the controller 110 by the sensors 126, 134, by components of a rotation mechanism 132 used to rotate the workpiece 106, or both. The second data includes a rotation direction of the workpiece 106, a rotation rate of the workpiece 106, other information, or combinations thereof.

The method 400, at block 410, includes sending signals based on the operation data from the controller 110 to one or more of the actuators 120 of the work platform 104 during rotation of the workpiece 106. The signals cause one or more of the actuators 120 to adjust extension lengths of the one or more slats 102 relative to the workpiece 106, cause one or more of the actuators to maintain a particular extension length, or both.

During work on the workpiece 106, one or more of the slat ends 114 can be set at a position outside of the separation distance range. For example, one or more slat ends 114 can become too close to the workpiece 106 or too far away from the workpiece 106 during rotation of the workpiece 106. The method 400, at block 412, includes receiving third data at the controller from the sensors 126, 134 associated with the slats 102. The third data indicates that the separation distance between one or more slats 102 and the workpiece 106 is outside of the separation distance range for over a particular amount of time.

The method, at block 414, includes stopping rotation of the workpiece 106 based on the third data. When the controller 110 stops rotation of the workpiece 106 based on the third data, the controller 110 sends information regarding the stoppage to one or more display devices, sounds an alarm, provides a visual indicator of a problem (e.g., a flashing yellow light if one or more of the slat ends 114 are too close to the workpiece 106 and a flashing red light if one or more of the slats 114 are too far away from the workpiece 106). The information provided to the one or more displays informs workers of a reason for the stoppage (e.g., ends of identified slats 102 are too close or too far away from the workpiece 106) and provides corrective information regarding one or more steps to be performed to allow continued rotation of the workpiece 106. A particular sound of the alarm, the particular visual alert, or both, inform workers if the workers need to walk off of the slats 102 to the floor 130 of the work platform 104 (e.g., a first alarm sound and a red flashing visual indicator) or if the workers can remain on the slats 102 (e.g., a second alarm sound and a yellow flashing visual indicator). The method 400, at block 416, includes resuming rotation of the workpiece 106 after completion of one or more corrective actions to reposition the slat ends 114 relative to the workpiece 106 in the separation distance range.

The method 400, at block 418, includes sending a signal to the access barrier 124 to block access to the slats 102 and moving the workpiece transport 108 away from the work platform 104 in response to input data that a work phase for the workpiece 106 is completed. The input data can be data entered via an interface of the controller 110 from a worker associated with the work phase. Responsive to the input data, the controller 110 sends a close signal to the access barrier 124 to close the access barrier 124 when no workers are on the slats 102, retracts the slats 102 to a retracted position, and provides output that enables the workpiece transport 108 to move the workpiece 106 away from the work platform 104.

Figure 5:
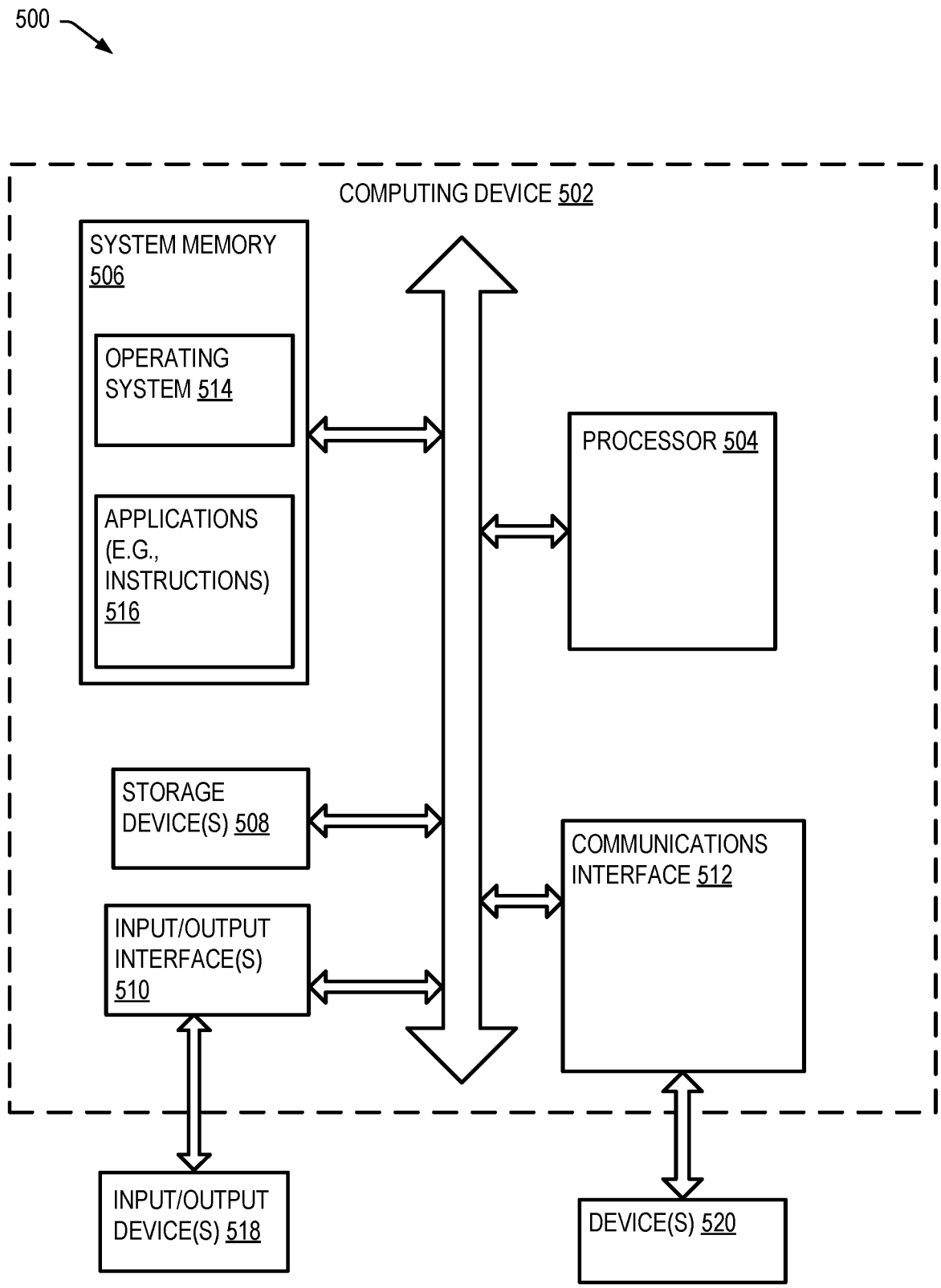
FIG. 5 is a diagram of a representation of a computer system that includes the controller of FIG. 1.

FIG. 5 is an illustration of a block diagram of a computing environment 500 including a general purpose computing device 502 configured to support implementations of computer-implemented methods and computer-executable program instructions (or code) according to the present disclosure. For example, the computing device 502, or portions thereof, may execute instructions to perform, or cause equipment to perform, operations described with reference to FIGS. 1-4. In an implementation, the computing device 502 is, or is a component of, the controller 110.

The computing device 502 includes a processor 504. The processor 504 communicates with a system memory 506, one or more storage devices 508, one or more input/output interfaces 510, one or more communications interfaces 512, or a combination thereof. The system memory 506 includes non-transitory computer readable media, including volatile memory devices (e.g., random access memory (RAM) devices), nonvolatile memory devices (e.g., read-only memory (ROM) devices, programmable read-only memory, and flash memory), or both. The system memory 506 includes an operating system 514, which may include a basic input/output system for booting the computing device 502 as well as a full operating system to enable the computing device 502 to interact with users, other programs, and other devices. The system memory 506 includes one or more applications 516 (e.g., instructions) which are executable by the processor 504.

The processor 504 communicates with the one or more storage devices 508. For example, the one or more storage devices 508 are non-transitory computer readable media that can include nonvolatile storage devices, such as magnetic disks, optical disks, or flash memory devices. The storage devices 508 can include both removable and non-removable memory devices. The storage devices 508 can be configured to store an operating system, images of operating systems, applications, and program data. In particular implementations, the system memory 506, the storage devices 508, or both, include tangible computer-readable media incorporated in hardware and which are not signals.

The processor 504 communicates with the one or more input/output interfaces 510 that enable the computing device 502 to communicate with one or more input/output devices 518 to facilitate user interaction. The input/output interfaces 510 can include serial interfaces (e.g., universal serial bus (USB) interfaces or Institute of Electrical and Electronics Engineers (IEEE) 1364 interfaces), parallel interfaces, display adapters, audio adapters, and other interfaces. The input/output devices 518 can include keyboards, pointing devices, displays, speakers, microphones, touch screens, and other devices. The processor 504 detects interaction events based on user input received via the input/output interfaces 510. Additionally, the processor 504 sends a display to a display device via the input/output interfaces 510.

The processor 504 can communicate with one or more devices 520 via the one or more communications interfaces 512. The one or more devices 520 can include host computers, servers, workstations, controllers, manufacturing devices, other computing devices, or combinations thereof. In a particular implementation, the one or more devices 520 include the sensors 126, 134. The one or more communications interfaces 512 may include wired Ethernet interfaces, IEEE 802 wireless interfaces, other wireless communication interfaces, one or more converters to convert analog signals to digital signals, electrical signals to optical signals, one or more converters to convert received optical signals to electrical signals, or other network interfaces.

Aspects of the disclosure are described further with reference to the following set of interrelated clauses:

According to Clause 1, a system to adjust extension lengths of slats of a work platform relative to a workpiece includes: one or more sensors to collect first data associated with a position of an outer surface of the workpiece at a height of the slats; actuators configured to extend or retract the slats; and a controller coupled to the one or more sensors and to the actuators, wherein the controller is configured to receive the first data and second data associated with rotation of the workpiece, wherein the controller is configured to provide signals to the actuators based on the first data and the second data, and wherein the signals cause the one or more actuators to adjust or maintain extension lengths of the slats of the work platform to maintain separation distances between ends of the slats and the outer surface of the workpiece within a separation distance range as the workpiece rotates.

Clause 2 includes the system of Clause 1, further including a workpiece transport for the workpiece, wherein the workpiece transport is configured to transport the workpiece to a position in working relation to the work platform, configured to rotate the workpiece relative to a longitudinal axis of the workpiece, and configured to provide the second data to the controller.

Clause 3 includes the system of Clause 2, wherein the workpiece transport comprises a rotation mechanism to rotate the workpiece, and wherein the rotation mechanism comprises at least one endpiece coupled to the workpiece.

Clause 4 includes the system of Clause 3, wherein the first data corresponds to contour information at one or more locations on an outer surface of the at least one endpiece.

Clause 5 includes the system of Clause 3, wherein the first data corresponds to an angular position of the at least one endpiece relative to a reference position.

Clause 6 includes the system of any of Clauses 1 to 5, wherein the first data corresponds to contour information at one or more locations on the outer surface of the workpiece or the outer surface of an endpiece coupled to the workpiece.

Clause 7 includes the system of Clause 6, wherein a sensor of the one or more sensors optically determines the contour information.

Clause 8 includes the system of Clause 6, wherein a sensor of the one or more sensors comprises a contact sensor including a sensor head that contacts the outer surface of the workpiece or the outer surface of the endpiece.

Clause 9 includes the system of any of Clauses 1 to 8, wherein the second data corresponds to a rotation rate of the workpiece.

Clause 10 includes the system of any of Clauses 1 to 9, wherein the separation distance range is between 2 centimeters and 15 centimeters.

According to clause 11, a system to adjust extension lengths of slats of a work platform relative to a workpiece includes: an endpiece configured to couple to the workpiece, wherein the endpiece comprises a gear portion; a rotation drive coupled to the gear portion, wherein the rotation drive is configured to rotate the workpiece relative to a longitudinal axis of the workpiece by rotation of the endpiece via the gear portion; a sensor to generate first data associated with a position of the endpiece; the work platform, wherein the work platform comprises the slats and actuators, wherein each slat of the slats is coupled to an actuator of the actuators, and wherein a particular actuator for a particular slat is configured to slide an end of the particular slat toward or away from an outer surface of the workpiece; and a controller coupled to the sensor, wherein the sensor is configured to receive the first data and configured to provide signals to the actuators based on the first data and based on second data associated with rotation of the workpiece, wherein the signals cause the actuators to adjust or maintain positions of ends of the slats relative to the outer surface so that separation distances between the outer surface and the ends of the slats are within a separation range after a change of the position of the workpiece due to rotation of the endpiece via the gear portion.

Clause 12 includes the system of Clause 11, wherein the workpiece comprises a mandrel for a fuselage of an aircraft.

Clause 13 includes the system of Clause 11 or Clause 12, wherein the second data indicates a rotation rate.

Clause 14 includes the system of any of Clauses 11 to 13, wherein the first data indicates an angular position of the endpiece relative to a reference position.

Clause 15 includes the system of any of Clauses 11 to 14, wherein the first data indicates contour information corresponding to a portion of an outer surface of the workpiece.

Clause 16 includes the system of Clause 15, wherein the sensor includes an optical sensor configured to determine the contour information based on detected optical signals.

Clause 17 includes the system of Clause 15, wherein the sensor includes a contact sensor configured to determine the contour information based on physical contact with indicia on a portion of the workpiece or with indicia on a portion of an endpiece coupled to the workpiece.

According to Clause 18, a method of adjusting extension lengths of slats of a work platform relative to a workpiece to accommodate rotation of the workpiece includes: obtaining operation data at a controller, wherein the operation data includes first data associated with a position of an outer surface of the workpiece at a height associated with the slat ends of the work platform and second data associated with rotation of the workpiece; and sending signals from the controller to one or more actuators of the work platform, wherein the signals are based on the operation data, and wherein the signals cause the actuators to adjust or maintain extension lengths of the slats of the work platform relative to the workpiece during rotation of the workpiece.

Clause 19 includes the method of claim 18 further including: receiving, at the controller, third data from one or more sensors associated with the slats, wherein the third data indicates that a separation distance between a slat and the workpiece is outside of a separation distance range for a particular time; and stopping rotation of the workpiece based on the third data.

Clause 20 includes the method of Clause 18 or Clause 19, wherein the extension lengths of the slats are adjusted based on the signals to have separation distances between ends of the slats and the workpiece of less than 15 centimeters.

The illustrations of the examples described herein are intended to provide a general understanding of the structure of the various implementations. The illustrations are not to scale and are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system to adjust extension lengths of slats of a work platform relative to a workpiece, the system comprising:
   one or more sensors to collect first data associated with a position of an outer surface of the workpiece at a height of the slats;
   actuators configured to extend or retract the slats; and
   a controller coupled to the one or more sensors and to the actuators, wherein the controller is configured to receive the first data and second data associated with rotation of the workpiece, wherein the controller is configured to provide signals to the actuators based on the first data and the second data, and wherein the signals cause the actuators to adjust or maintain extension lengths of the slats of the work platform to maintain separation distances between ends of the slats and the outer surface of the workpiece within a separation distance range as the workpiece rotates.

2. The system of claim 1, further comprising a workpiece transport for the workpiece, wherein the workpiece transport is configured to transport the workpiece to a position in working relation to the work platform, configured to rotate the workpiece relative to a longitudinal axis of the workpiece, and configured to provide the second data to the controller.

3. The system of claim 2, wherein the workpiece transport comprises a rotation mechanism to rotate the workpiece, and wherein the rotation mechanism comprises at least one endpiece coupled to the workpiece.

4. The system of claim 3, wherein the first data corresponds to contour information at one or more locations on an outer surface of the at least one endpiece.

5. The system of claim 3, wherein the first data corresponds to an angular position of the at least one endpiece relative to a reference position.

6. The system of claim 1, wherein the first data corresponds to contour information at one or more locations on the outer surface of the workpiece or an outer surface of an endpiece coupled to the workpiece.

7. The system of claim 6, wherein a sensor of the one or more sensors optically determines the contour information.

8. The system of claim 6, wherein a sensor of the one or more sensors comprises a contact sensor including a sensor head that contacts the outer surface of the workpiece or the outer surface of the endpiece.

9. The system of claim 1, wherein the second data corresponds to a rotation rate of the workpiece.

10. The system of claim 1, wherein the separation distance range is between 2 centimeters and 15 centimeters.

11. A system to adjust extension lengths of slats of a work platform relative to a workpiece, the system comprising:
- an endpiece configured to couple to the workpiece, wherein the endpiece comprises a gear portion;
- a rotation drive coupled to the gear portion, wherein the rotation drive is configured to rotate the workpiece relative to a longitudinal axis of the workpiece by rotation of the endpiece via the gear portion;
- a sensor to generate first data associated with a position of the endpiece;
- the work platform, wherein the work platform comprises the slats and actuators, wherein each slat of the slats is coupled to an actuator of the actuators, and wherein a particular actuator of the actuators for a particular slat of the slats is configured to slide an end of the particular slat toward or away from an outer surface of the workpiece; and
- a controller coupled to the sensor, wherein the sensor is configured to receive the first data and configured to provide signals to the actuators based on the first data and based on second data associated with the rotation of the workpiece, wherein the signals cause the actuators to adjust or maintain positions of ends of the slats relative to the outer surface of the workpiece so that separation distances between the outer surface of the workpiece and the ends of the slats are within a separation range after a change of the position of the workpiece due to rotation of the endpiece via the gear portion.

12. The system of claim 11, wherein the workpiece comprises a mandrel for a fuselage of an aircraft.

13. The system of claim 11, wherein the second data indicates a rotation rate.

14. The system of claim 11, wherein the first data indicates an angular position of the endpiece relative to a reference position.

15. The system of claim 11, wherein the first data indicates contour information corresponding to a portion of the outer surface of the workpiece.

16. The system of claim 15, wherein the sensor includes an optical sensor configured to determine the contour information based on detected optical signals.

17. The system of claim 15, wherein the sensor includes a contact sensor configured to determine the contour information based on physical contact with indicia on a portion of the workpiece or with indicia on a portion of the endpiece coupled to the workpiece.

* * * * *